No. 841,817. PATENTED JAN. 22, 1907.
W. C. RICKETTS.
REGULATOR FOR AUTOMATICALLY CONTROLLING THE FLOW
AND TEMPERATURE OF LIQUIDS.
APPLICATION FILED JULY 13, 1905.
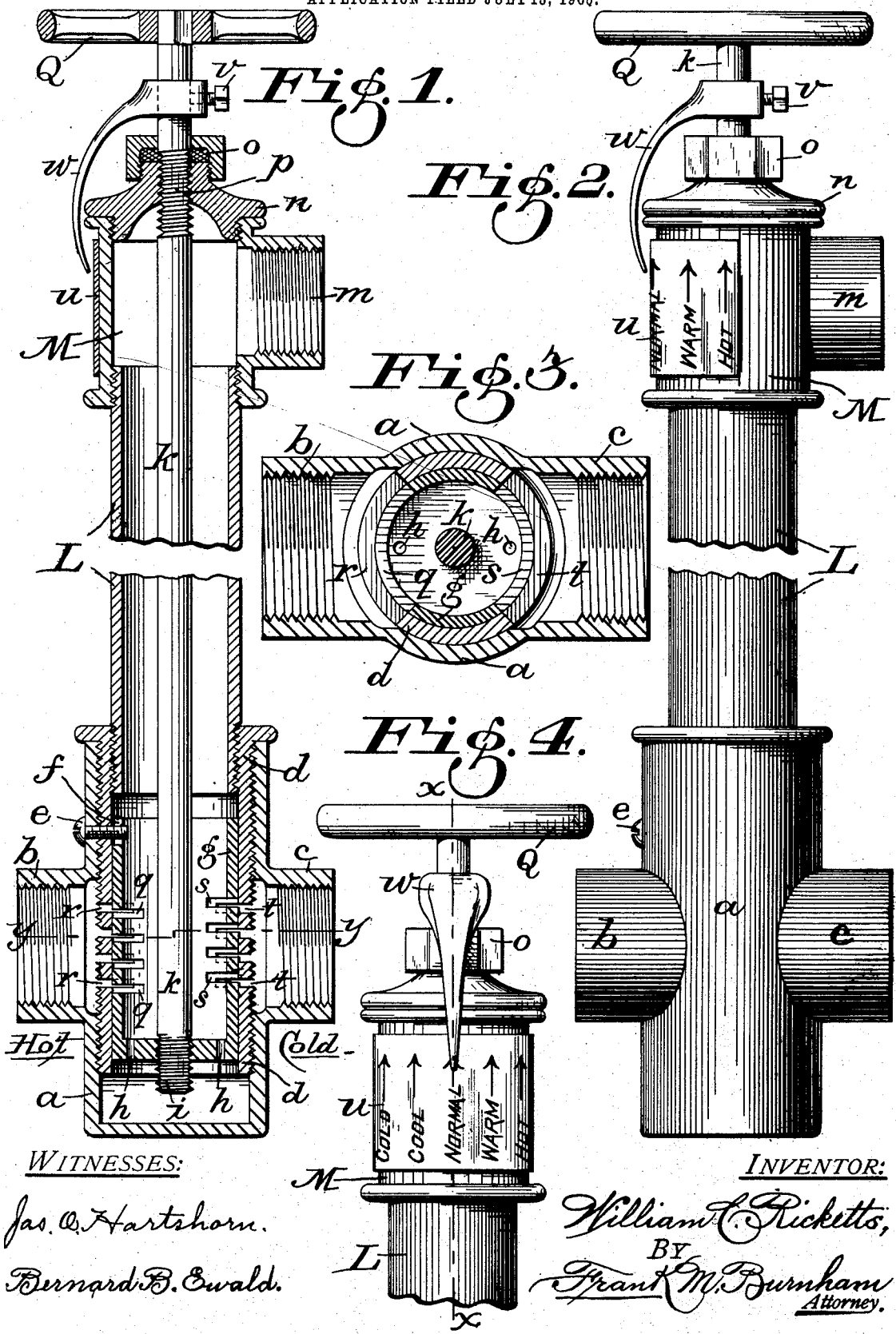
WITNESSES:
Jas. O. Hartshorn.
Bernard B. Ewald.
INVENTOR:
William C. Ricketts,
BY Frank M. Burnham
Attorney.

UNITED STATES PATENT OFFICE.

WILLIAM C. RICKETTS, OF DAYTON, OHIO.

REGULATOR FOR AUTOMATICALLY CONTROLLING THE FLOW AND TEMPERATURE OF LIQUIDS.

No. 841,817.      Specification of Letters Patent.      Patented Jan. 22, 1907.

Application filed July 13, 1905. Serial No. 269,451.

*To all whom it may concern:*

Be it known that I, WILLIAM C. RICKETTS, a citizen of the United States, residing at Dayton, in the county of Montgomery and State of Ohio, have invented certain new and useful Improvements in Regulators for Automatically Controlling the Flow and Temperature of Liquids; and I do hereby declare the following to be a full, clear, and exact description of the invention, such as will enable others, as well as those skilled in the art to which it appertains, to make and use the same, reference being had to the accompanying drawings, and to the letters of reference marked thereon, which form a part of this specification.

My invention relates to a regulator for automatically controlling the flow and temperature of liquids, or, in other words, means whereby flowing liquids may be so manipulated as to automatically and adjustably effect the temperature and pressure of the same as desired.

While my device is intended and designed more directly and particularly for automatically and adjustably manipulating the water for baths and various purposes generally, in which connection it is herein illustrated, described, and claimed, it will be obvious that said device may be similarly used to equal advantage for other kinds of liquids and for any other purpose desired—as, for example, for service in paper-mills, dairy plants, &c.

Some of the principal objects of my invention consist, first, in producing a device to so effect the temperature and pressure of the feed-waters under varying conditions, whereby there will always be established an even and unvarying or desired degree of temperature of the mixture or water as discharged therefrom; second, to so construct said device as to provide means for automatically and adjustably accomplishing the objects above stated, further objects being to produce a device of the character and kind as herein referred to that consists of few parts, can be readily taken apart for cleaning, &c., is simple in construction, inexpensive in cost of manufacture, and effective in its results.

My invention consists, essentially, referring in general terms to the construction of my regulator for automatically controlling the flow and temperature of liquids, of the body provided with the receiving ends, the valve sleeve or collar provided with the slotted ports, the sliding valve provided with slotted ports, the expanding stem and hand-wheel, the connecting-pipe, the discharge end having the discharge or mouth, the dial and indicating hand or pointer, and the minor parts connecting therewith, and the peculiar and novel construction, arrangement, and combination of these various mechanical parts, as will be hereinafter more fully described in detail and pointed out in the subjoined claims in accordance with the statutes in such cases made and provided therefor.

Referring to the accompanying drawings constituting a formal part of this specification, and wherein the same letters of reference indicate the same parts wherever occurring throughout the several views, Figure 1 is a vertical longitudinal sectional view of my device, taken on line $x\,x$ of Fig. 4. Fig. 2 is a side elevation of same. Fig. 3 is a transverse sectional view through the receiving ends and taken on line $y\,y$ of Fig. 1, but on a slightly-enlarged scale therefrom; and Fig. 4 is a view of a broken-away portion of the front, so as to more fully show the dial and indicating hand or pointer.

In describing my said invention specifically and referring in detail to the various mechanical parts or elements of construction of my regulator for automatically controlling the flow and temperature of liquids, as shown throughout the several views of the accompanying drawings and indicated by means of the letters of reference as aforesaid, $a$ refers to the body of the regulator, which is formed with the receiving ends $b$ and $c$, one of said ends being intended when in practice to be connected, by means of its screw-threads, to a hot-water pipe, while the other end is intended to be connected in like manner to a cold-water pipe, and in this instance, as shown in the drawings and indicated in Fig. 1 by the words "Hot" and "Cold," receiving end $b$ designates the end adapted to be connected to the hot-water pipe, while receiving end $c$ is the end adapted to be connected to the cold-water pipe, the hot and cold water pipes of course not being here shown, as they are no part of my invention.

Valve sleeve or collar $d$ is provided at its top with an annular flange, which bears against and rests down on the top of body $a$ when the parts are assembled in operative position, and said valve-sleeve is inserted in its normal position in said body by reason of ordinary screw-threaded connection therewith. (See Fig. 1.)

For the purpose of holding and retaining body $a$ and valve-sleeve $d$ in relative position to each other and preventing their being moved by reason of their screw-threads until it is desired so to do for the purpose of cleaning or otherwise, set-screw $e$ is employed, which passes entirely through said body and said valve-sleeve and is of sufficient length to extend beyond and through recess $f$ in the top or open end of sliding valve $g$, thus acting as a stop for said valve and preventing it from turning or moving laterally, while limiting its play or movement vertically or longitudinally in valve-sleeve $d$, in which it telescopes, the valve-sleeve being open at both ends and having a smooth interior surface extending a sufficient and greater portion of its length to permit of valve $g$ to have a slidable movement therein and in a direction from the closed to the open end of body $a$. (See Fig. 1.) As fully and clearly shown in Fig. 1, sliding valve $g$ is open at one end, while its opposite end is of sufficient thickness to receive the screw-threaded end $i$ of the expanding stem $k$, said stem being intended in practice to be constructed out of zinc or similar material having a large coefficient of expansion, the purpose of which will be more fully disclosed hereinafter. Said closed end of valve $g$ is further provided with waste-water openings $h$, which allow and permit of all waste water from any cause whatsoever, and of which there is always more or less constantly accumulating in the space between the closed end of the valve and the closed end of the body through the force of suction, to be drawn up and back through openings $h$ into said valve and utilized with the feed-waters when the valve is operated.

Connecting-pipe L has a suitable screw-threaded connection with discharge end M, which is provided with a discharge or mouth $m$, adapted to have connected thereto any convenient style or form of faucet or stopcock desired. Discharge end M is further provided with a cap $n$ and stuffing-box $o$, securely held together in position by ordinary screw-threads, said cap and stuffing-box having passing through them the screw-threaded portion $p$ of expanding stem $k$, and keyed to the top of said expanding stem is a handle, preferably in shape of a hand-wheel Q, as shown.

The difference between the pitch and size of the screw-threads at $p$ and at $i$ on the expanding stem will regulate the travel of said stem so that when it is moved downward by turning or operating its hand-wheel Q the sliding valve $g$ will also have been moved down until its slotted ports $q$ on one side of said valve will not have fully or entirely passed below the slotted ports $r$ on this side of the valve-sleeve, but just leaving space enough for a certain amount of hot water coming from any source of supply through receiving end $b$ to pass through the small space left between said ports $r$ and $q$, as just referred to, into the interior of valve $g$, and at same time and simultaneously with the entrance of the hot water on this one side the slotted ports $s$ on opposite side of the sliding valve, which are placed so as to come above the ports $q$ on opposite side, or about midway or dovetail therewith as to a horizontal line, will then have left only a very slight degree of space between them and the ports $t$ on this side of the valve-sleeve $d$, and all the ports will have assumed their respective and relative positions one to the other, as clearly shown in Fig. 1, and the cold water as it comes from any source of supply will pass into receiving end $c$, and thence through the space left between the ports $t$ and $s$ and enter valve $g$ in a similar manner to the hot water on opposite side, when said hot and cold feed-waters rushing into the valve from each side and in an opposite direction will cause a turmoil and mingling until resulting in a perfect mixture, which will pass up connecting-pipe L and into discharge end M and out through discharge or mouth $m$ and thence through a faucet, stopcock, or any ordinary outlet to the bath-tub or other device wherein said mixed water is to be utilized.

Discharge end M is provided in any manner desired with a dial $u$, upon which, as shown, is marked in the center thereof the word "Normal" and one side thereof the words "Cold" and "Cool," and on the other side thereof are the words "Hot" and "Warm," while above each of these words and pointing therefrom is an arrow. Mounted upon expanding stem $k$ and retained in position by means of a small set-screw $v$ at its head or socket is an indicating hand or pointer $w$, which, being thus firmly retained, will move with said stem, when turned by operating its hand-wheel, as above described, until indicating-hand $w$ will indicate or point to the degree of temperature, as marked upon the dial and indicated by means of the word and its arrow leading therefrom, and in this instance, and as an example for the purpose of fully setting forth and clearly explaining my invention in detail, I have illustrated my device as having the indicating-hand pointing to the word "Normal," as indicated by its arrow on the dial, and all the parts have now been moved to their relative positions, as heretofore fully described, so that the feed-waters coming from any source of supply through receiving ends $b$ and $c$ as they rush together and intermingle will produce a mixture which will be discharged from mouth $m$, having a normal degree of temperature, as desired.

It will of course be obvious that the operation of this device will always be the same in any case, no matter what the temperature of the water desired is. Now suppose it is desired to have hot water discharged from the outlet to be connected to mouth m. By simply turning hand-wheel Q until indicating-hand w will rest over the arrow leading or pointing from the word "Hot," when expanding-stem k will have turned, by reason of its screw-threads at p and i, just sufficiently to move or raise valve g, which is forced to move in the proper direction by reason of set-screw e, which now acts as a stop, until slotted ports q of valve g will have fully registered or coincided with slotted ports r of valve sleeve or collar d, when an open communication will have thus been established with the interior of valve g, and the hot water from receiving end b will rush in, while simultaneously therewith cold-water ports s on opposite side of valve g will have slid past and above ports t on this side and in valve-sleeve d, and ports t will have thus been closed by the walls of said valve, while the hot water, which has entered from opposite side, will pass up through the connecting-pipe, discharge end, and discharge or mouth through the outlet means, the same as in the case of the water having a normal temperature, as heretofore described. Slotted ports r and t in the valve-sleeve d, also slotted ports q and s in valve g, are intended to be simply narrow slots cut by a circular saw into said valve-sleeve and said valve, both of which are hollow cylindrical bodies, and the slotted ports are cut in a row or series on each side thereof, and run only sufficiently deep so as not to weaken these bodies. The slots or ports in the row on each side of the valve-sleeve are to coincide with each other or come on a horizontal line one with the other, while the slots or ports as cut on one side of the sliding valve are to dovetail or alternate with those in the opposite side of the valve, as shown.

Constructing expanding stem k out of zinc or similar material, thus making it very sensitive to any change in temperature, will cause it to readily contract or expand, according to the temperature of the water, thus causing it to automatically assist in operating the device; but the principal advantage consists in the fact that should there be any variation of the temperature of the hot or cold feed-waters as they come from the source of supply when the device is set for water of a certain temperature, this change will be automatically corrected through the expansion or contraction of said stem, thus always automatically regulating the valve and the ports so as to offset this change, and thus equalizing these differences, whereby an even, proper, and desired degree of temperature, as first started with, will be the result, so that these changes will never affect the water as it comes from the discharge or mouth.

One very important feature of my invention and which gives my device special advantage is that the temperature of discharged water can never exceed a temperature of 120°, which is as high as the average person can stand or endure, and this is owing to the construction of the stem, which is so very sensitive that any greater degree of heat will have caused said stem to expand to such an extent as to have entirely closed the ports, the space between which, as stated, is not very great.

It will of course be obvious and readily understood that my device may be constructed in various sizes, according to the special use for which it may in each instance be intended; also, that a greater or lesser number of ports than here shown may be employed, when so desired, so as to increase or decrease the volume as discharged; also, that various minor changes in the arrangement, construction, and combination of the different parts as may from time to time be suggested may be made, so long as confined to the spirit of this invention and not departing from the principles of the same.

Having now described my device and the invention covering the same, what I claim is—

1. In a regulator for automatically controlling the flow and temperature of liquids, the combination with a body portion having the ends adapted to receive water; of a sleeve adapted to rest within said body portion, and provided with ports; a sliding valve provided with ports and adapted to move within said sleeve; an expanding stem connected to said sleeve; a discharge end having a discharge or mouth; means for conducting the water from said sleeve to said discharge end; means for operating said stem; and means for indicating the degree of temperature of the water desired; all substantially as and for the purposes described.

2. The combination in a regulator for liquids; of a body having receiving ends; a valve-sleeve provided with ports, those on one side being on the same horizontal plane with those on the other side, and adapted to rest securely within said body portion; a sliding valve provided with ports on opposite sides, the ports on one side being staggered with reference to those on the other side thereof, and also provided with means for utilizing the waste water; a stem sensitive to heat for supporting said valve by means of its screw-threads and adapted to work automatically by reason of contraction and expansion, a connecting-pipe; a discharge end having a discharge or mouth and a dial and indicating hand or pointer; all substantially as and for the purposes and in the manner described.

3. The combination in the herein-referred-to water-regulator, of a body provided with receiving ends; a valve-sleeve provided with slotted ports and adapted to rest within said body; a valve provided with slotted ports and waste-water openings and adapted to have a slight sliding mvement within said sleeve; a stem sensitive to heat attached to the valve and provided with a hand-wheel or handle; a connecting pipe; a discharge end provided with a mouth a dial and indicating hand; all substantially as and for the purposes described.

In testimony whereof I affix my signature in presence of two witnesses.

WILLIAM C. RICKETTS.

Witnesses:
JAMES O. HARTSHORN,
BERNARD B. EWALD.